United States Patent [19]
Epperlein

[11] 3,791,096
[45] Feb. 12, 1974

[54] COUPLING UNIT FOR STRUCTURAL ELEMENTS

[75] Inventor: Helmut Epperlein, Dietersweiler, Germany

[73] Assignee: Christian Holzapfel K.G., Horb/Neckar, Germany

[22] Filed: Feb. 16, 1972

[21] Appl. No.: 226,685

[30] Foreign Application Priority Data
Oct. 6, 1971 Germany............................ 2149831

[52] U.S. Cl. ............. 52/758 C, 24/218, 52/753 C
[51] Int. Cl. ............................................. F16b 1/00
[58] Field of Search 287/189.36 R, 20.92 C, 20.92 D; 292/77, 17; 211/177; 24/73 HS, 21 W

[56] References Cited
UNITED STATES PATENTS
2,385,565  9/1945  Cox...................................... 24/218
3,602,284  8/1971  Smith.................................... 85/1 K FOREIGN PATENTS OR APPLICATIONS
1,001,846  2/1952  France......................... 287/20.92 C Primary Examiner—Dave W. Arola
Attorney, Agent, or Firm—Michael S. Striker

[57] ABSTRACT

An angular first member is a bracket having two mutually inclined arms one of which can be fastened to a structural element and the other of which extends normal to it and has a free edge with a slot extending inwardly from the free edge and a pair of holes being formed in the region of the free edge at opposite lateral sides of the slot. A spring clip is provided on this other arm overlying the slot having a substantially circular portion which encircles an inner end of the slot and two legs which extend in unbiased condition of the spring clip at 90° angle to the circular portion and whose free ends are received in the holes provided in the other arm, so that the legs are biased towards one another to some extent and their juncture with the circular portion defines a width or gap which is somewhat narrower than the width of the slot. A second member is configured as a bolt which can be secured to another structural element and whose shaft can be snapped into the circular portion of the spring clip, being retained therein by the legs of the spring clip in the region of their juncture. The shaft has a head which prevents its withdrawal in axial direction from the slot.

6 Claims, 1 Drawing Figure

PATENTED FEB 12 1974
3,791,096
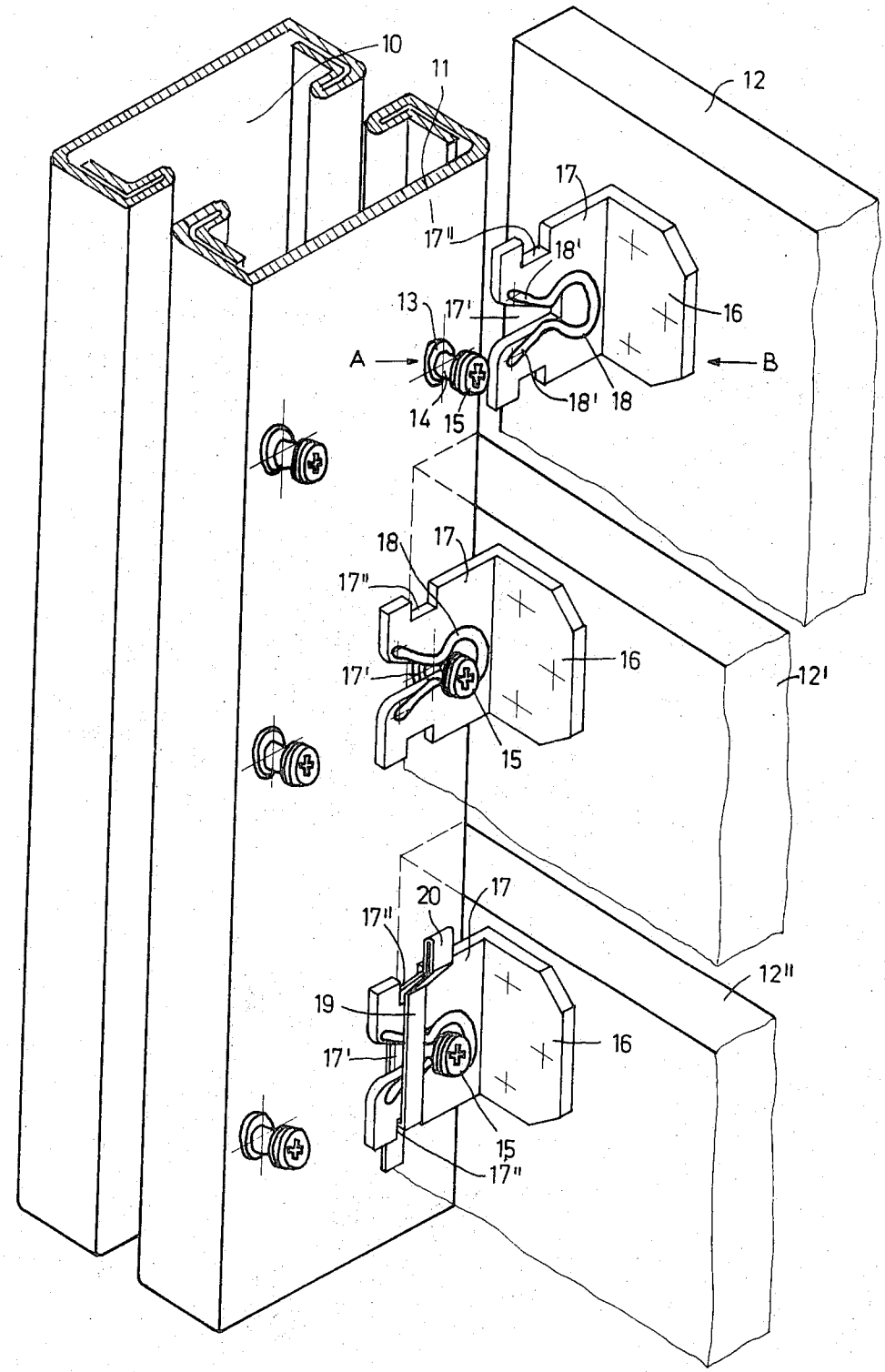

COUPLING UNIT FOR STRUCTURAL ELEMENTS

BACKGROUND OF THE INVENTION

The present invention relates generally to a coupling unit and more particularly to a coupling unit for detachably coupling structural elements.

There are many instances where it is necessary or desirable to be able to releasably or detachably couple structural elements to one another. This is particularly found in applications where a cladding panel or the like has to be secured to a support, for instance in a room divider or the like, where it is desirable to connect a cladding panel or other structural element to an upright post which is secured at the floor and ceiling of a room. The use of such divider walls or marginal furniture walls is becoming evermore widespread and it is of course one of their prime advantages that they can be erected and disassembled at will, so that they can be moved from place to place or taken from one house or apartment to another. A further advantage is that it is possible to vary their configuration and appearance by adding or subtracting different components.

However, such installations of course require suitable couplings for releasably but yet firmly coupling the various structural elements with one another. A further requirement is that they can be supported at the ceiling and the floor of a room. The latter problem has already been properly solved, but the former problem is still in need of further improvements. To be considered in proposing such improvement is the fact that in all solutions the erecting, modifying and disassembling of such structures must be as handy and as little time consuming as possible, and that it must be capable of being carried out by persons of no particular technical or other skill, and without requiring any special tools. This latter consideration is important because such structures are usually intended for erection or disassembly or modification by the purchaser himself, that is by the so-called do-it-yourselfer, who in most instances has neigher particular skills nor special tools available.

SUMMARY OF THE INVENTION

It is, accordingly, an object of the present invention to provide a coupling unit which will afford the aforementioned advantages.

More particularly it is an object of the invention to provide such a coupling unit which affords detachable coupling of two structural elements.

A concomitant object is to provide such a coupling unit which can be readily operated without requiring special tools or special skills.

Another object of the invention is to provide such a coupling unit here under discussion which is particularly simple in its construction.

In pursuance of these and other objects which will become apparent hereafter one feature of the invention resides in a coupling unit for detachably coupling two structural elements to one another. The coupling unit comprises, briefly stated, an angular first member having two mutually inclined arms, one of the arms being adapted for fastening to a structural element and the other arm having a free edge, a slot extending inwardly therefrom and a pair of holes in the region of the free edge at opposite sides of the slot. A spring clip is provided on the other arm overlying the slot and having a substantially circular portion overlying the inner end of the slot and a pair of legs extending from the circular portion angled thereto, located at opposite sides of the slot and having free ends received in the holes. The legs are spaced at their juncture with the circular portion by a smaller distance than the width of the slot. A second member has a shaft adapted to be fastened to another structural element and to be received in the slot and clampingly retained therein by the spring clip, and a head for preventing withdrawal of the latter axially thereof from the slot.

This means that the shaft is simply inserted from the open end into the slot and is pushed past the narrower region defined by the juncture of the legs with the circular portion of the spring clip, somewhat in the manner of a snap fastener, thereupon being retained without requiring the utilization of special tools.

The novel features which are considered as characteristic for the invention are set forth in particular in the appended claims. The invention itself however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE is a perspective view illustrating an embodiment of the invention.

DESCRIPTION OF THE PREFERRED EMBODIMENTS

Discussing the FIGURE in detail it will be seen that three of of the novel units have been illustrated in the FIGURE, with a single first structural element, and three second structural elements which are connected with the first structural element. The three units are shown in three different assembly stages to clearly illustrate not only their construction but also their operation.

With this in mind it is pointed out that reference numerals 10 and 11 designate two substantially C-shaped metallic profiles which are connected with one another to provide an upright structural member, such as a post, with which other structural members 12, 12', 12'' are to be connected. The means connecting the profiles 10 and 11 with one another are not illustrated as not being a part of the invention.

In accordance with the invention, the novel coupling unit is composed of two major parts, namely a part A (here illustrated as connected with the post composed of the profiles 10 and 11) and a part B (here illustrated as connected with the structural members 12, 12', 12'', respectively). Of course, part A could be connected with one of the members 12, 12' or 12'', and part B could be connected with the post composed of the profiles 10 and 11.

The portions or members A are in form of screws or bolts which are threaded into profile 11 and have a shaft 14, a shoulder or flange 13 which abuts against the section 11 when the portion A has been threaded into it to a predetermined extent and a head 15 at the other end of the shaft 14.

The other portion B of the unit is in form of an angle bracket having two mutually normal arms 16 and 17. Of course, they need not be mutually normal, but will always have to be inclined. The arm 16 is suitably secured, for instance by non-illustrated screws, to the respective structural member 12, 12' or 12'', and the arm 17 is provided in one of its free edges with an inwardly extending slot 17' the inner end of which is widened that is in the illustrated embodiment the slot 17' is convergent in inward direction until at the inner end it is wider. However, it could simply be inwardly convergent and not have a wider inner end. Located on one major surface of the arm 17 so as to embrace or surround the slot 17' is a spring clip 18 of substantially circular outline having two arms 18' which in unstressed or unbiased condition extend at 90° with reference to the portion 18. Free ends of the arms 18' are angled or bent-over and are received in holes provided for this purpose in the arm 17 in the region of the free edge thereof and at opposite sides of the slit or slot 17'. The arrangement is such that when these angled end portions are received in these holes, the arms will be under slight inward tension or bias and at the narrowest point of the spring clip, at the juncture of the arms 18' with the portion 18, the space defined at the juncture will be narrower than the width of the slot 17' at the region underlying the narrowest point of the clip.

To connect the two parts A and B of the unit it is simply necessary to move them relative to one another so that, as shown with respect to the structural member 12' and the associated part B, the part A of the unit will enter into the slot 17' until it encounters the narrowest part of the spring clip 18, 18'. At this time it is necessary to exert sufficient force to temporarily deflect the spring clip so that it will permit the shaft 14 of the part A to pass into the confines of the circular portion 18 of the spring clip, whereupon the latter snaps back to its configuration shown in connection with the structural member 12'', and the member A is thus retained in an analogous manner to a snap fastener. It abuts against the inner end of the slot 17 and is thus properly retained without freedom of any movement. The head 15 of course prevents withdrawal in direction normal to the elongation of the slot 17'.

To provide a further safeguard against undesired or unauthorized removal of the structural element 12, 12' or 12'' from the element composed of the sections 10 and 11, it is advantageous to provide a latching arrangement which is shown in connection with the unit illustrating as coupling the element 12'' to the section 11. This unit is the same as the units illustrated with respect to the elements 12 and 12', but a further component has been utilized which was not yet shown in connection with the units on elements 12 and 12' because it is added only after the coupling has been accomplished.

The arm 17 is provided at its edges which are located laterally of the slot 17' with cutouts 17'' and a strip-shaped member 19 of spring steel or the like is provided which extends transversely across the slot 17' and has portions which are received with a snap action in the cutout 17''. In the illustrated embodiment, the member 19 is in form of a spring 20 having two legs of approximately 5 mm. wide spring steel, with one leg extending across the slot 17' at one major surface of the arm 17 and the other leg extending across the slot 17' at the opposite major surface of the arm 17, as illustrated. Offset or bentover portions of the spring 20 snap into the cutouts 17' as shown and are retained therein because of their springly characteristic. Thus, it is impossible to withdraw the shaft 14 from the confines of the spring clip 18, 18' until the spring 20 is first removed, providing an additional safety against undesired or unauthorized separation.

Of course, different materials can be used for the various components, and although for instance the part B is advantageously made of sheet metal, such as sheet steel, other materials are conceivable for this purpose. The same is true of the spring 20, and also the dimensions and configurations described herein and illustrated in the drawing may be varied without departing from the scope and intent of the invention.

It will be understood that each of the elements described above, or two or more together, may also find a useful application in other types of constructions, differing from the types described above.

While the invention has been illustrated and described as embodied in a coupling unit for coupling structural elements, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A coupling unit for detachably coupling two structural elements, comprising an angular first member having two mutually inclined arms, one of said arms being adapted for fastening to one structural element, and the other of said arms having a free edge, a slot extending inwardly therefrom, and a pair of holes in the region of said free edge at opposite sides of said slot; a spring clip on said other arm overlying said slot and having a substantially circular portion overlying an inner end of said slot, said spring clip having a pair of legs extending from said circular portion and angled thereto, and said legs being located at opposite sides of said slot and having free ends received in said holes, said legs being spaced at their juncture with said circular portion by a smaller distance than the width of said slot; and a second member having a shaft with a minimum diameter greater than said distance adapted to be fastened to another structural element and to be received in said slot inwardly of said juncture so as to be clampingly retained in said slot by said spring clip, said shaft having a head for preventing withdrawal of the same axially thereof from said slot, whereby to permit a snap-action type coupling of said one and said other structural elements.

2. A coupling unit as defined in claim 1, wherein said first member is of sheet metal.

3. A coupling unit as defined in claim 1, wherein said slot converges from said free edge toward said inner end.

4. A coupling unit as defined in claim 1, wherein said spring clip is of spring wire.

5. A coupling unit for detachably coupling two structural elements, comprising an angular first member having two mutually inclined arms, one of said arms being adapted for fastening to one structural element, and the other of said arms having a free edge, a slot extending inwardly therefrom, a pair of holes in the region of said free edge at opposite sides of said slot, and recesses; a spring clip on said other arm overlying said slot and having a substantially circular portion overlying an inner end of said slot, said spring clip having a pair of legs extending from said circular portion and angled thereto, and said legs being located at opposite sides of said slot and having free ends received in said holes, said legs being spaced at their juncture with said circular portion by a smaller distance than the width of said slot; a second member having a shaft with a minimum diameter greater than said distance adapted to be fastened to another structural element and to be received in said slot inwardly of said juncture so as to be clampingly retained in said slot by said spring clip, said shaft having a head for preventing withdrawal of the same axially thereof from said slot; and a strip-shaped spring member extending across said slot intermediate said free edge and said juncture, said spring member being snapped into said recesses.

6. A coupling unit as defined in claim 5, said other arm having two edge portions located at opposite sides of said slot and extending along the latter, said recesses being cut-outs in said edge portions; and wherein said spring member straddles said other arm and has two parts each of which extends across said slot and is partially received in one of said cut-outs.

* * * * *